No. 799,061. PATENTED SEPT. 12, 1905.
C. KELLNER.
ELECTROLYTIC APPARATUS AND ELECTRODES THEREFOR.
APPLICATION FILED JULY 7, 1896.
2 SHEETS—SHEET 1.
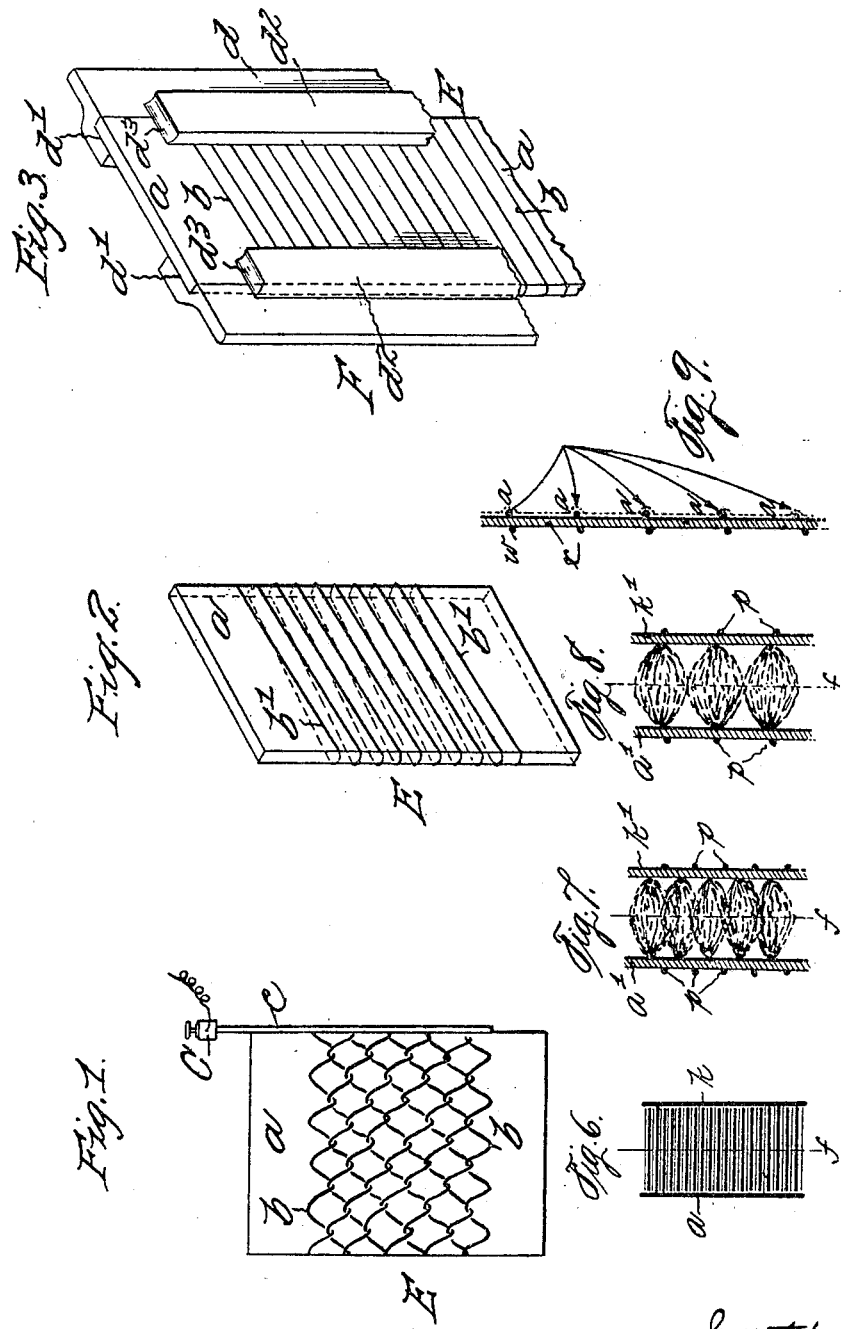

No. 799,061. PATENTED SEPT. 12, 1905.
C. KELLNER.
ELECTROLYTIC APPARATUS AND ELECTRODES THEREFOR.
APPLICATION FILED JULY 7, 1896.
2 SHEETS—SHEET 2.
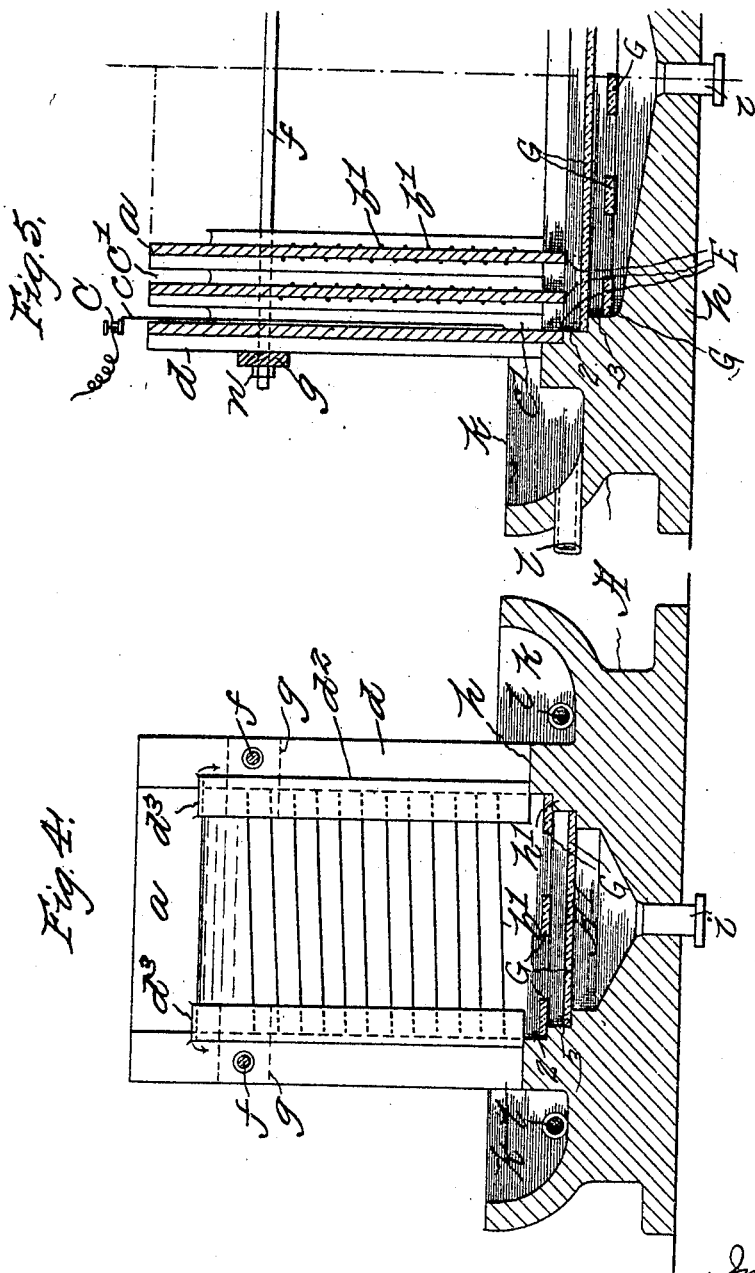

UNITED STATES PATENT OFFICE.

CARL KELLNER, OF HALLEIN, AUSTRIA-HUNGARY.

ELECTROLYTIC APPARATUS AND ELECTRODES THEREFOR.

No. 799,061.           Specification of Letters Patent.           Patented Sept. 12, 1905.

Application filed July 7, 1896. Serial No. 598,357.

*To all whom it may concern:*

Be it known that I, CARL KELLNER, a subject of the Emperor of Austria-Hungary, residing at Hallein, Austria-Hungary, have invented certain new and useful Improvements in Electrolytic Apparatus and Electrodes Therefor; and I do hereby declare the following to be a full, clear, and exact description of the invention, such as will enable others skilled in the art to which it appertains to make and use the same, reference being had to the accompanying drawings and to letters and figures of reference marked thereon, which form a part of this specification.

Researches have shown that in electrolysis many of the ensuing reactions are materially influenced by current densities, so that with the means hitherto available certain electrolytical processes cannot be carried out in such an economical manner as to render them industrially or commercially available because of the high tension necessary for obtaining the required amperage per square decimeter. Electrolytic processes requiring the passage through the electrolyte of currents of high densities cannot be economically carried out with solid-plate electrodes, especially of platinum, because of the great cost of this material. A current from solid-plate electrodes will either be of insufficient density for the purpose or uncontrollable.

The construction of electrodes in accordance with my invention is based upon the interdependence of the electrical, chemical, and physical properties of the electrolyte to be decomposed and also in a measure on the dimensions—that is to say, on the capacity of the electrolytic apparatus.

After many experiments I have discovered that current of the required density can be passed through an electrolyte by the use of a comparatively very small amount of conductive material as compared with the use of solid electrodes, and this I attain by distributing the conductive material over the surfaces of an insulating material in such a manner as to obtain a bipolar electrode. To this end I construct the electrodes of any suitable insulating material not affected by the electrolyte, as glass, celluloid, porcelain, gutta-percha—in fact, of any non-conductor of electricity capable of being molded or otherwise fashioned to the desired shape or form—while the conductive material applied to the surfaces of the insulating material may be secured thereto in any desired manner, as by staples, rivets, or clamps, or may be preferably wound on said insulating material, or said conductive material may be made in the form of a net, in which the insulating material is sheathed, or said conductive material may be embedded in the insulating material so as to project therefrom. In practice I prefer platinum wire as a conductive material, either simply wound about or forming a net-sheathing for a plate of glass as insulating material. Now in carrying out my invention the conductor is suitably spaced on the carrier, while electrodes thus formed must of course be suitably spaced in the electrolytic apparatus, whereby I am enabled to utilize for useful work substantially the whole of the current density at the surface of the electrodes with a comparatively small amount of conductive material and supply the electrolyte with current of the required density, (amperage,) while at the same time I reduce in proportion to the increase in the density of the current on the surface of the electrodes the distributing influence of certain secondary reactions, such as the reducing action of nascent hydrogen, &c.

The described action of my electrodes has been fully proven by practice and may be theoretically explained as follows: According to modern views each dissociated particle of the electrolyte—that is, each particle in the condition of an ion—in contact with the electrode gives up its charge to the electrode and passes at the same time into its elementary condition. If this process is graphically imagined, certain lines are produced along which the electrolyte is subjected to a change by the movement of its particles in the state of ions. With solid-plate electrodes these lines are substantially in planes at right angles to the electrode-surfaces, while with conductive points or lines, as by wire tips or wire windings, these lines are established in the form of brushes or bundles which spread or subside toward said points or lines—a phenomenon which may perhaps be compared with the lines of force of a magnetic pole or with the point effect of a conductor charged with static electricity. The size of the field thus produced about such a point is of course proportionate to the conductivity of the electrolyte, so that when said points are too close to one another said fields merge into one another peripherally, thereby producing a zone in which the separation of the ions cannot keep pace with the discharge of the ions should such discharge proceed as rapidly as from fields that do not overlap. This will have for its result that notwithstanding the great number of points the quantity of current flowing through the electrodes will not be greater than with a less number of points. The described phenomena may be expressed in a few words as follows: The conductivity of an electrolyte depends upon its condition of dissociation—that is, upon the number of molecules in ion form present in a square unit of cross-section. With an electrolyte of high conductivity—that is, with a great number of molecules in ion form—it is not necessary to cover the entire cross-section of the electrolyte with an electric conductor, (electrode,) it being sufficient when current is supplied to a number of properly-spaced points distributed uniformly over the entire cross-sectional area of the electrolyte. The number of these points per superficial unit of electrode must be increased in proportion to the decrease in ions in the electrolyte—$i.\ e.$, in proportion to the decrease in conductivity. In other words, for the passing of an electric current through a unit of the superficial area of an electrode the number of metallic current-receiving points distributed over said unit of superficial area should be sufficiently great to effect the discharge of the ions in accordance with the conductivity of the electrolyte. An increase in the number of such points could not possibly result in a corresponding increase of current flowing through said electrolyte cross-section and would therefore be simply a waste of the material of which the conductive points are made. The following will make this clear: Referring to Figure 6, wherein the electrodes $a\ k$ are supposed to be solid platinum plates and the current flowing from $a$ to $k$ of a density $i$ corresponding with the conductivity of the electrolyte, the tension, and temperature. It is furthermore supposed that the cross-section $f$ of the electrolyte has under the conditions referred to and the distance 1, between the electrodes a conductive and decomposing resistance $w$. This resistance $w$ is therefore conditioned upon the rapidity at which the ions on $a$ and $k$ are discharged—that is to say, upon the rapidity at which a given number of molecules discharged per electrolyte cross-section can be given up at $a$ and $k$. In the case under consideration the discharge takes place on lines perpendicular to the proximate electrode-surfaces, so that the ensuing movement of the ions proceeds on perfectly parallel lines. If, as shown in Fig. 7, electrodes $a'\ k'$, constructed according to this invention, but having a greater number of points $p$ than is absolutely necessary, be substituted for the solid-plate electrodes, Fig. 6, then the direction in which the molecules in a state of dissociation tend to move will be such, as shown in said Fig. 2, that the lines of flow emanating from a point $p$ of the conductor on an electrode will cut or intersect (peripherally) the lines of force emanating from a point $p$ above and below, and thus produce zones in which the movement of the electrolyte particles cannot keep pace with the discharge of the ions, as hereinbefore stated, or, in other words, the points $p$ are too close together, resulting in a practical waste of conductive material. When, on the contrary, the conductive points $p$ are so spaced that the lines of force do not intersect or cut one another, as shown in Fig. 8, there is no waste or inefficient conductive material. The small number of points required for the passing of the same quantity of current at the tension referred to through the cross-section $f$ of the electrolyte is, however, always dependent upon the rapidity at which the condition of dissociation of the electrolyte in the cross-section $f$ can be attained, so that under certain conditions the three points of discharge, Fig. 8, are capable of affording passage to as many amperes as the five points, Fig. 7, or the infinite number of points, Fig. 6, while another important and essentially beneficent result obtained lies in the minimizing of certain disturbing secondary processes hereinbefore referred to. Thus, for instance, in the production of a concentrated solution of hypochlorite it is not possible to obtain with solid-plate electrodes a solution containing more than about 0.78 per cent. of active chlorin without an excessive expenditure of current. This is due, as is well known, to the reducing action of the nascent hydrogen at the cathode upon the hypochlorite, whereby the latter is reduced to a chlorid. It is also known that hydrogen can be supplied to a hypochlorite solution without provoking a reducing reaction. Hence the reduction is due only to the action of the hydrogen in a nascent state, so that only those particles of hypochlorite are reduced which are in contact with the electrode—that is to say, with that point of the electrode where a hydrogen ion gives up its charge and goes over into an elementary state. The hydrogen in the form of gas-bubbles in the electrolyte does not act reducingly. It is therefore clear that more-highly-concentrated solutions, as solutions containing more than one per cent. active chlorin, can be obtained only when the superficial area of the cathode is very small relatively to the cross-section of the electrolyte and the quantity of electricity supplied thereto; but in order to force the same current intensity (amperes) through a small plate electrode it would become necessary to increase the current tension very materially, and this would again give rise to the formations of chlorate. When, however, the current-conductor is distributed over the electrode-surface according to my invention, it is possible to obtain hypochlorite solutions containing high percentage of active chlorin (hypochlorite) without a waste of current, because the injurious reducing action of the nascent hydrogen is reduced to minimum in so far that only those hypochlorite molecules in direct contact with the wires will be reduced, while those lying along the insulating material $a$ between the wires $w$, Fig. 9, will remain unaffected, because the hydrogen after it passes once into the electrolyte does not act reducingly, as above stated. Since only those molecules of hypochlorite in direct contact with the conductor $w$ are reduced by nascent hydrogen and inasmuch as with equal plate areas (for instance, 8dm$^2$) this electrode-surface is according to this invention reduced to one-eighth, the reducing action of the nascent hydrogen will be correspondingly reduced. On the other hand, the temperature of the electrolyte is not increased to such an extent by too high current tensions as to convert the nascent hypochlorite into a chlorate.

From what has been said above it is obvious that an exact formula for the distribution of the conductor over the carrier cannot be given, because various factors (current tension, concentration of the electrolyte, temperature and composition of the latter, the required decomposing tension, number of wire windings, and distance between the electrodes) have to be taken into consideration in order to obtain the best results, so that the most advantageous distances between the conductive points and the electrodes must be emperically determined; but that my invention may be fully understood I will describe the same in detail, reference being had to the accompanying drawings, in which—

Fig. 1 is a face view of an electrode constructed in accordance with my invention. Fig. 2 is a perspective view illustrating a modified arrangement of the conductor on the carrier. Fig. 3 is a perspective view of an electrode frame or holder, the electrode being partly broken away. Fig. 4 is a vertical transverse section of a preferred form of electrolytic apparatus. Fig. 5 is a fragmentary longitudinal section thereof; and Figs. 6, 7, 8, and 9 are diagrams explanatory of the flow of current through the electrolyte and the reducing actions of nascent hydrogen.

The electrode E shown in Fig. 1 consists of an insulating-plate $a$, of any suitable material, as glass, porcelain, ebonite, celluloid, &c., covered with or sheathed in a platinum-wire netting $b$, the size of mesh of which determines or is determined by the distance between the electrodes and may be of from three to eight millimeters. If such an electrode is to be included in an electric circuit, the netting $b$ is connected with a platinum-plated copper wire $c$. provided with a suitable pole-clamp C. Instead of platinum-wire netting $b$, Fig. 1, a platinum wire $b'$ may be wound on the plate-carrier $a$, as shown in Fig. 2, the spaces between the windings determining or being determined by the space between the electrodes and other considerations, as before mentioned.

Electrodes constructed as described are assembled in frame F, of wood, glass, porcelain, celluloid, or any other desirable and suitable insulating material. Said frames are composed of two side pieces or bars $d$, constructed with an offset $d'$, on which the edges of the electrode E fit, and with ledges or cleats $d^2$, that project from said side pieces $d$ over the electrode, thus forming a groove into which the said electrode can be inserted and are made tight by means of tar, gutta-percha, asbestos, or by pressure after assembling by means of bracing-bars $g$, tie-rods $f$, and nuts $n$. The ledges $d^2$ are shorter than the side pieces $d$ and have their upper faces grooved, as shown in Fig. 3. Any suitable number of these electrode-frames are laid upon one another and connected together by the aforesaid tie-rods $f$, screw-threaded at their outer ends to receive the clamping-nuts $n$, said rods passing through cross-bars $g$ and through the several side pieces or bars $d$ of the frames. The lower edges of the plate-carriers $a$ project from their respective frames, the whole forming an electrode block or group, divided by the frames into cells $c'$, which may or may not be liquid-tight, small leakage not being harmful, as the electrolyte is pumped one or more times through the apparatus, the thickness of the cleats $d^2$ and that of the offset portions on the side bars or pieces $d$ determining the width of the cells $c'$ or the distance between the electrodes E, and they also determine or are determined by the size of mesh of the conductor-netting $b$ or the distance between the windings of the wire conductor $b'$.

The electrolytic apparatus consists of a shallow vessel A, of suitable material, that has a longitudinal central recess or trough A', the side walls of which are stepped and converge below the stepped portions, a feed-pipe $i$ being provided for the supply of the electrolyte. A collecting trough or channel $k$ extends along each side of this central depression or cavity A' of the vessel A, said channels being each connected with a discharge-pipe $l$, and, as shown in Figs. 4 and 5, the outer wall of said channels rises above the lateral walls of the central trough A'.

The assembled group of electrodes or electrode-block is set onto the vessel so that the side bars $d$ of the frames seat upon the upper faces of the lateral walls $h$ of the central trough A', the electrode seating on the step $h'$ next below the frame-seat. If the electrolyte be pumped through pipe $i$, it will fill the trough A' and gradually rise into the cells between the electrodes, become decomposed by the electric current, and overflow along the upper channeled faces $d^3$ of the cleats $d^2$ into the channels $k$, from which it is taken through pipe $l$. In order to insure a uniform distribution through the cells of the electrolyte, the space below the carriers E in the trough A' may be filled with glass balls or strips of glass. When this is effected by means of bars of insulating material unaffected by the electrolyte—as, for instance, bars or plates of glass—I construct the apparatus with additional ledges or steps 2 and 3, Figs. 4 and 5, upon which the glass bars G are laid so as to form a grating, the bars or plates G on the lower steps 3 lying crosswise and those on the steps 2 lengthwise of the apparatus, as shown in Figs. 4 and 5, which arrangement may of course be reversed or glass balls substituted so as to divide the stream of electrolyte flowing into the apparatus in such a manner that a uniform flow of the electrolyte through the various cells will be established, which could in the absence of the bars or balls not be done, as the velocity of flow immediately above the inlet would be greater than at any other point of the apparatus, said inlet being located, by preference, about the longitudinal center of the apparatus. This interposition of non-conducting bars or balls has for its further object to prevent lines of current from flowing from one end of the apparatus to the other or from one end electrode to the other. Of course this loss in current cannot be entirely avoided, yet by means of the described arrangement the cross-section of the electrolyte is reduced and the resistance thereby increased in such manner as to cause the main portion of the current to flow from electrode to electrode, thereby reducing the loss in current in a downward direction.

Having thus described my invention, what I claim is—

1. An electrode comprising a carrier of insulating material and a conductive wire wound thereon to form two active faces each presenting the wire to the solution to be electrolyzed, one face acting as anode and the other as cathode, and a suitable frame to support said electrode at its edges.

2. An electrode, comprising a flat carrier of insulating material, a platinum wire wound thereon to form two faces composed of wire, the convolutions of which do not touch, one face acting as anode and the other face as cathode, and a suitable frame to support said electrode and cover the wires where they pass around the edges of the carrier, substantially as and for the purpose set forth.

3. In combination, a plurality of oppositely-disposed frames having vertical grooves therein, one of the side walls of said grooves being cut away at its upper end, plates of insulating material held at opposite vertical edges in said frames, means to hold adjacent frames to one another and a suitable base for the assembled parts, substantially as described.

4. In combination, a plurality of oppositely-disposed frames having vertical grooves therein, glass plates having helices of platinum wire wound thereon and held liquid-tight in opposite grooves, side pieces at opposite sides of the frames assembled in juxtaposition, means to draw the side pieces together, a stepped base, the lower ends of the frames resting on one step and the glass plates on another and means to supply electrolyte to the base, substantially as described.

5. In electrolytic apparatus, a bipolar electrode consisting of an insulating-carrier and a conductor distributed at given distances over its opposite surfaces, the distribution being such as to give a maximum current density per unit area of exposed conductor for a given current and electrolyte.

6. A group of electrodes comprising a plurality of juxtaposited frames composed of opposite side bars each provided with grooves in their proximate faces, bipolar electrodes seated in each pair of opposite grooves, a cut-away portion on one side of each groove to form an overflow, cross-bars extending across the side bars of the first and last of the electrode-frames, and tie-rods passing through said cross-bars and through the side bars of all the frames, for the purpose set forth.

7. An electrolytic apparatus comprising a vessel provided with a central depression or cavity, the inner faces of the side walls of which are stepped, a channel extending along said side walls, a feed-pipe leading to said central cavity or depression, and discharge-pipes leading from said channels; in combination with a plurality of framed electrodes arranged relatively to their frames so that the said electrodes will rest upon a step of the aforesaid side walls and the frames upon the upper edge of such walls, and means connecting the electrode-frames together, for the purpose set forth.

8. In an electrolytic apparatus, bipolar electrodes each consisting of an insulating-plate having fine platinum wire wound thereon, the distance between the wires not being over five millimeters, a frame for each plate and means to clamp the frames together, substantially as described.

In testimony that I claim the foregoing as my invention I have signed my name in presence of two subscribing witnesses.

CARL KELLNER.

Witnesses:
 H. R. HOWENSTEIN,
 HENRY ORTH, Jr.